Nov. 23, 1926.
F. D. WINKLEY
LUBRICATING APPARATUS
Filed March 19, 1920
1,607,855
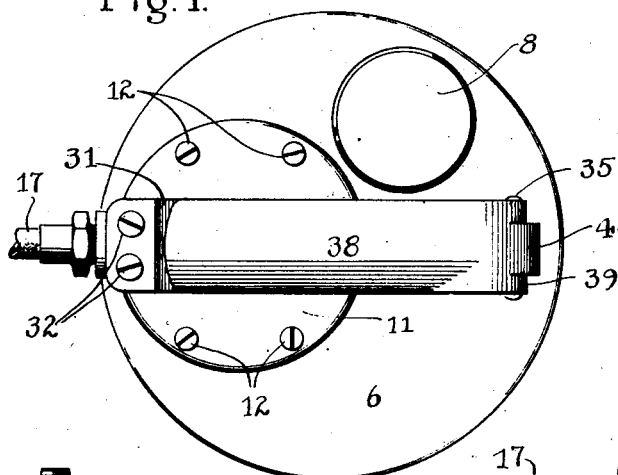
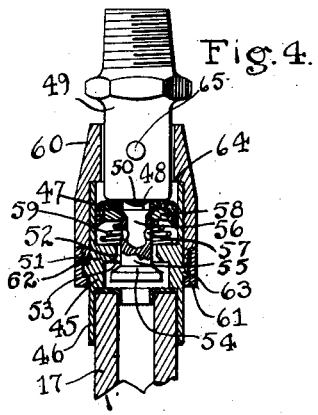
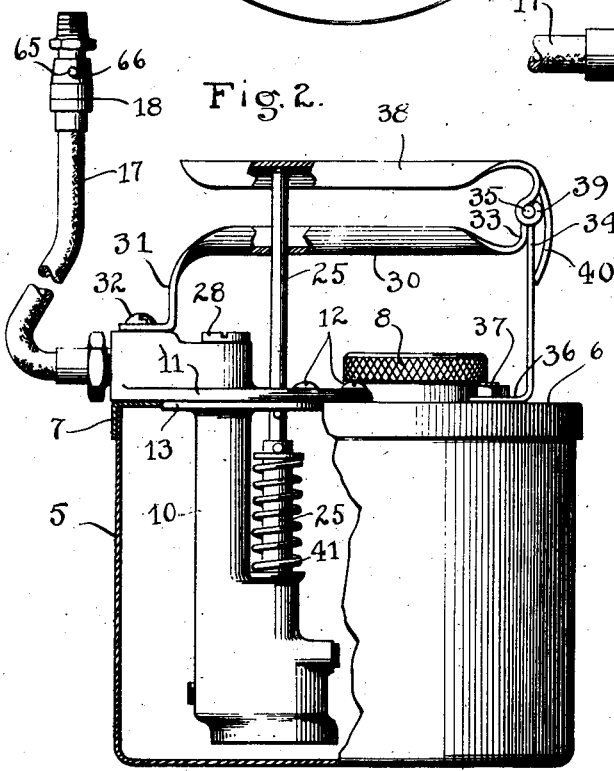
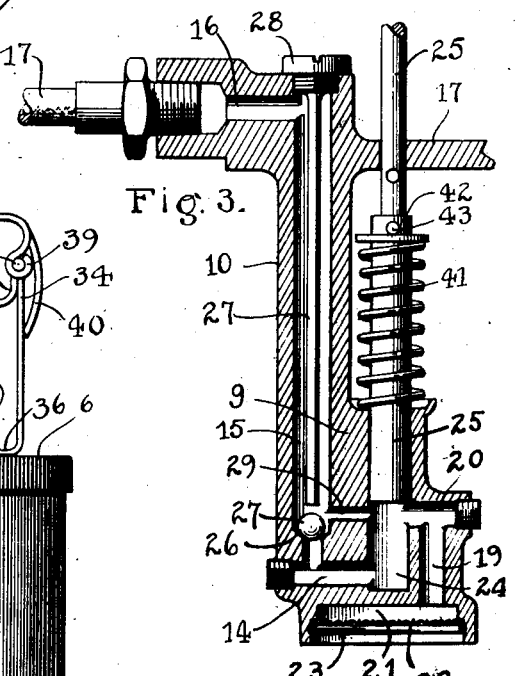
Inventor
Frank D. Winkley
Attorneys Patented Nov. 23, 1926.

1,607,855

UNITED STATES PATENT OFFICE.

FRANK D. WINKLEY, OF MADISON, WISCONSIN, ASSIGNOR, BY MESNE ASSIGNMENTS, TO THE BASSICK MANUFACTURING COMPANY, A CORPORATION OF DELAWARE.

LUBRICATING APPARATUS.

Application filed March 19, 1920. Serial No. 367,198.

My invention relates to improvements in lubricating apparatus and is especially concerned with the improvement of lubricating apparatus of that type in which the bearings of a machine to be lubricated are each provided with a lubricant receiving member or nipple to which lubricant may be supplied, under pressure, by a lubricant pump or compressor having a discharge conduit provided at its free end with a coupling member adapted to be detachably connected to the nipples.

The objects of my invention are—

First; to provide a novel type of compressor for supplying lubricant to lubricant receiving members or nipples comprising means whereby the lubricant supplied to the nipples can be placed under exceedingly high pressures.

Second; to provide a lubricant compressor of the type described, comprising a discharge conduit having a coupling member at the free end thereof comprising means for preventing the escape of lubricant from the coupling member when it is detached from the nipples, the compressor comprising means for relieving the pressure on the coupling member so that there will be no danger of the lubricant being forced therethrough when the coupling member is detached from the nipple.

Third; to provide a compressor of the type described comprising a receptacle for containing the lubricant to be supplied to the nipples, the pump of said compressor being located in said receptacle and comprising means whereby the discharge conduit can be vented into the receptacle to relieve the pressure upon the coupling member, and Fourth; to provide a compressor of the type described which is simple in construction, economical to manufacture, durable and easy to operate.

Other objects will appear as this description progresses, reference being had to the accompanying drawings, in which—

Figure 1 is a plan view of my improved compressor, portions thereof being broken away.

Figure 2 is a side elevation with portions broken away.

Figure 3 is a central longitudinal section on an enlarged scale through a portion of my apparatus, and Figure 4 is an enlarged sectional detail of one type of coupling member which I may embody in my apparatus.

Referring to the drawings, the reference character 5 indicates a container or receptacle for holding a supply of lubricant which is to be forced into the lubricant receiving nipples. This receptacle is preferably drawn from sheet metal and provided with a drawn sheet metal closure 6, the flange 7 of which may be soldered or otherwise secured to the upper end of the receptacle. The closure is provided with a filling opening which is closed by the cap 8 which may be of any suitable construction.

The means which I prefer for forcing the lubricant into the lubricant receiving nipples comprises a body member 9 having a riser 10 extending upwardly and through a second opening in the closure 6. The upper end of the riser is provided with an outwardly extending flange 11, which may be secured to the closure 6 by means of screws 12 or in any other suitable manner, the flange being provided with a circular downwardly extending boss 13 fitting the opening in the closure. A plurality of bores 14, 15, and 16, formed in the body member and the riser, provide a discharge passageway through which the lubricant is discharged into the flexible discharge conduit 17 formed of suitable flexible metallic hose and having the coupling member 18 at the free end thereof, which is adapted to be connected with the nipples to which the lubricant is supplied. The body member is provided with a plurality of bores 19 and 20 communicating with each other and forming the intake passageway of the compressor. The lower end of the intake passageway communicates with the interior of the receptacle 5 through the enlarged bore 21, which is provided with a screen 22 held in place by means of the split ring 23 and tending to prevent dirt and other foreign matter, in the lubricant, from being drawn into the compressor. The inner or adjacent ends of the intake and discharge passageways are connected by the cylinder 24, in which is reciprocably mounted the plunger 25.

A valve seat 26 is formed in the discharge passageway adjacent the lower end and provides a seat for the check valve 27, the movement of which is limited by the rod 27 extending downwardly from the screw plug 28 at the upper end of the bore 15.

For the purpose of relieving the pressure in the discharge conduit and in the coupling member, for a reason which will be referred to later on, I provide a by-pass 29 around the check valve, connecting the discharge passageway with the intake passageway through the cylinder.

The upper end of the plunger 25, which is reduced in cross-section, extends through a suitable bearing in the flange 17. For forcing the plunger inwardly to displace the lubricant from the cylinder 24, I provide two sheet metal hand grips which are concavo-convex in cross section, with their concave sides turned towards each other. One of these hand grips 30, has one of its ends 31 turned down and outwardly and secured to the upper end of the riser 10 by means of a screw 32 or in any other suitable way. The opposite end of the hand grip is reversely bent upon itself, as shown at 33 and 34, to form a support for the pivot pin 35, the portion 34 being continued downwardly and bent inwardly as shown at 36. A screw 37 passes through the portion 36 and into the closure 6 for securing this end of the hand grip 30 to the closure. A second hand grip 38 extends substantially parallel with the hand grip 30 and is provided at one end with bearings 39 journaled on the pin 35 and an extension 40 adapted to co-act with the downturned portion of the grip 30 to provide a stop for limiting the movement of the hand grip 38. The upper end of the plunger 25 extends through an opening in the hand grip 30 and contacts with the inner side of the hand grip 38, being held in this position by a spring 41 confined between the upper end of the walls of the cylinder 24 and a collar 42, secured to the plunger by a pin 43, the spring 41 tending to retract the plunger from the cylinder.

In Figure 4 I have illustrated the details of construction of a coupling member which may form a portion of my improved lubricating apparatus. This coupling member comprises, in general, a sleeve 45, one end 46 of which is soldered or otherwise secured to the free end of the discharge conduit 17 and the other end of which receives the flexible gasket or cup leather 47, of leather or other suitable material, which is provided with a central orifice or aperture 48, registering with the opening in the end of the nipple 49, which is closed by a spring-pressed closure 50. An inwardly extending flange 51 provides a discharge port 52 and a valve seat 53, with which the valve 54 co-acts to prevent the discharge of lubricant from the coupling member. The stem 55 of the valve is smaller in diameter than the discharge port 52 and its outer end is hollow, as shown at 56, the walls of the hollow portion of said stem being provided with openings 57 for the passage of lubricant therethrough.

The outer end of the valve stem is swedged over onto a washer 58 which is held against the gasket or cup leather 47 by the compression spring 59, one end of which abuts against the said washer and the other end of which abuts against the outer side of the flange 51. A second sleeve, formed of the two parts 60 and 61, threaded together at 62, is rotatably mounted upon the sleeve 45 and is prevented from being displaced therefrom by the annular rib 63 which is received in an annular groove formed by the two portions of the outer sleeve. The diameter of the bore of the outer sleeve at its end is slightly less than the diameter of the bore of the outer end of the inner sleeve, thereby providing a shoulder 64 which acts as a stop to limit the movement of the gasket 47. This result is also obtained by engagement of the valve 54 with its seat.

The nipple 49 has a pin 65 extending from both sides thereof, the ends of which are adapted to co-act with the bayonet slots 66 in the coupling member to provide a detachable connection between the coupling member and the nipple.

I do not claim, as my invention, the details of construction of the coupling member and nipple described above, nor is my invention to be limited to a coupling member and nipple, having the details of construction above described, this type of coupling member and nipple merely being illustrative of my invention.

In use, the receptacle 5 of my improved apparatus is filled with lubricant and the receptacle can be carried by the operator, the hand grip 30 acting as a handle for supporting the receptacle. The operator carries the receptacle with its discharge conduit about the machine to be lubricated and successively attaches and detaches the coupling member to the nipples to be lubricated. When the coupling member is attached to a nipple, the valve 54 will be displaced from its seat as shown in Figure 4. The operator, by tightening his grip upon the hand grips 30 and 38 causes the plunger 25 to be forced inwardly thereby forcing the lubricant from the cylinder 24 which had previously flowed into the cylinder 24 from the receptacle through the intake passageway 19. Upon releasing his grip on the hand grip 38, the spring 41 retracts the plunger, more lubricant flows into the cylinder from the receptacle, the lubricant forced into the discharge conduit being prevented from backward flow by the check valve 27 and from flowing into the cylinder through the by-pass 29 by reason of the restricted size of this passageway.

By successive reciprocations of the plunger, the discharge conduit is completely filled with lubricant and when the pressure is increased to a certain point, the lubricant will be forced into the nipple and the bearing supplied thereby. When sufficient lubricant has been forced into the bearing and pressure is released from the hand grip 38, the plunger will be withdrawn to a point permitting a few drops of the lubricant in the discharge conduit to return to the cylinder through the by-pass 29, thereby reducing the pressure in the discharge conduit to practically nothing, which will permit the coupling member 18 to be easily detached from the nipple and will, at the same time, relieve the pressure on the valve 54 so that there is no tendency for lubricant to be forced past this valve. The coupling member is then detached from the nipple and attached to the next one and the operation repeated.

The by-pass 29 is of such size that but very little of the lubricant will escape from the discharge conduit during the interval between the detaching of the coupling member 18 from one nipple and attaching it to the next nipple, consequently after the discharge conduit has once been filled, it is not necessary to completely refill it by the operation of the plunger each time the coupling member is attached to a different nipple. It is merely necessary to replace the lubricant discharged through the by-pass 29 before the pressure becomes effective to force lubricant into the nipple.

If the discharge conduit of the nipple is supported in an upright position, as shown in Figure 2, when the apparatus is not in use, the lubricant in the discharge conduit will eventually drain back into the receptacle and thereby prevent any loss of lubricant which might occur by reason of the valve not completely closing on account of dust, dirt or other matter sticking to the valve seat.

While I have described the details of the preferred embodiment of my invention, it is to be clearly understood that my invention is not limited to these details, but is capable of other adaptations and modifications within the scope of the appended claims.

Having thus described my invention, what I claim is:

1. In a lubricant compressor having means for detachably coupling said compressor to a lubricant receiving nipple, the combination of a receptacle, a closure for said receptacle having a filling opening therein, said closure having a second opening, a pump in said receptacle adjacent the bottom thereof, said pump comprising a body member having a riser formed integrally therewith, said riser extending through said second opening and having an outwardly extending flange closing said opening, means for securing said flange to said closure, said body member and riser having a discharge passage-way, a check valve in said discharge passage-way opening toward said coupling means, said body member having an intake passage-way communicating with the interior of said receptacle and a cylinder connecting said intake and discharge passage-ways, there being a restricted return by-pass between said discharge passage-way and said cylinder, a charge passage-way and said cylinder, a plunger reciprocable in said cylinder and having a portion extending outside of said receptacle, means co-acting with said extending portion whereby said plunger can be forced inwardly, and a spring for retracting said plunger.

2. In a lubricant compressor having means for detachably coupling said compressor to a lubricant receiving nipple, the combination of a receptacle, a closure for said receptacle, said closure having an opening, a pump in said receptacle adjacent the bottom thereof, said pump comprising a body member having a riser formed integrally therewith, said riser extending through said opening, said body member and riser having a discharge passage-way, a check valve in said discharge passage-way opening toward said coupling passage-way opening toward said coupling means, said body member having an intake passage-way communicating with the interior of said receptacle and a cylinder connecting said intake and discharge passage-way, there being a return by-pass between said discharge passage-way and said cylinder, a plunger in said cylinder, and means for reciprocating said plunger.

3. In a lubricant compressor having means for detachably coupling said compressor to a lubricant receiving nipple, the combination of a receptacle, a closure for said receptacle, said closure having an opening, a pump in said receptacle adjacent the bottom thereof, said pump comprising a body member having a riser formed integrally therewith, said riser extending through said opening, said body member and riser having a discharge passage-way, a check valve in said discharge passage-way opening towards said coupling means, said body member having an intake passage-way communicating with the interior of said receptacle and a cylinder connecting said intake and discharge passage-ways, a plunger in said cylinder, and means for reciprocating said plunger.

4. In a lubricant compressor having means for detachably coupling said compressor to a lubricant receiving nipple, the combination of a receptacle, a pump in said receptacle, said pump comprising a body member having discharge and intake passage-ways and a cylinder connecting the inner ends of said passage-ways, the outer end of said intake passage-way communicating with the interior of said receptacle, a check valve in said discharge passage-way, said body member having a passage-way by-passing said check valve and connecting said discharge passage-way and cylinder, a plunger in said cylinder, and means for reciprocating said plunger.

5. In a lubricant compressor having means for detachably coupling said compressor to a lubricant receiving nipple, the combination of a receptacle, a pump in said receptacle, said pump comprising a body member having discharge and intake passage-ways and a cylinder connecting the inner ends of said passage-ways, the outer end of said intake passage-way communicating with the interior of said receptacle, means for preventing reverse flow of lubricant through a portion of said discharge passage-way, a plunger in said cylinder, and means for venting said discharge passage-way into said cylinder when said plunger is in a predetermined position.

6. In a lubricant compressor having means for detachably coupling said compressor to a lubricant receiving nipple, the combination of a receptacle, a body member having discharge and intake passage-way and a cylinder connecting the inner ends of said passage-ways, the outer end of said intake passage-way communicating with the interior of said receptacle, means for preventing reverse flow of lubricant through a portion of said discharge passage-way, a plunger in said cylinder, and means for venting said discharge passage-way when said plunger is in a predetermined position.

7. The combination with a receptacle for holding lubricant, of a discharge conduit for conducting lubricant from said receptacle having a coupling member at its free end for making a detachable connection with a lubricant receiving member, means in said receptacle for forcing the lubricant from said receptacle through said discharge conduit, and means for venting said discharge conduit into said receptacle through said forcing means.

8. The combination with a receptacle for holding lubricant, of a discharge conduit for conducting lubricant from said receptacle having a coupling member at its free end for making a detachable connection with a lubricant receiving member, means in said receptacle for forcing the lubricant from said receptacle through said discharge conduit, and means controlled by said forcing means for venting said discharge conduit into said receptacle.

9. A lubricant compressor comprising a lubricant receptacle, a high pressure cylinder communicating therewith, a discharge conduit communicating with said high pressure cylinder, a plunger for expelling lubricant from said high pressure cylinder, and means for establishing communication between said high pressure cylinder and said receptacle and between said high pressure cylinder and said discharge conduit when said plunger is retracted to its initial position.

10. A lubricant dispensing device comprising a lubricant receptacle and means for receiving lubricant from said receptacle and discharging it under pressure, comprising a cylinder carried by said receptacle, a plunger reciprocable therein, and means for reducing the pressure upon the discharged lubricant, said means being controlled by the movement of said plunger.

11. A lubricant dispensing device comprising a receptacle, a high pressure cylinder supported by and communicating with said receptacle, a discharge conduit for receiving lubricant from said high pressure cylinder, means for discharging lubricant from said high pressure cylinder, and means for venting said discharge conduit when said last named means is in a predetermined position.

12. A lubricant dispensing device comprising a lubricant receptacle, a high pressure cylinder having an inlet port communicating with said receptacle, means for ejecting the contents of said cylinder, a valve chamber communicating with the discharge end of said cylinder, a valve closing the discharge end of said cylinder, and a by-pass for establishing communication between said valve chamber and said cylinder.

13. A lubricant dispensing device comprising a lubricant receptacle, a high pressure cylinder having an inlet port communicating with said receptacle, means for ejecting the contents of said cylinder, a valve chamber communicating with the discharge end of said cylinder, a valve closing the discharge end of said cylinder, and a by-pass for establishing communication between said valve chamber and said cylinder at a point adjacent the inlet port of said cylinder.

In witness whereof, I hereunto subscribe my name this 15 day of March, 1920.

FRANK D. WINKLEY.